March 20, 1962 E. A. WILKENSON 3,025,777
AUTOMATIC COMPENSATION FOR FILM EMULSION SPEED
IN A CAMERA WITH LIGHT METER
Filed Dec. 2, 1960 3 Sheets-Sheet 1
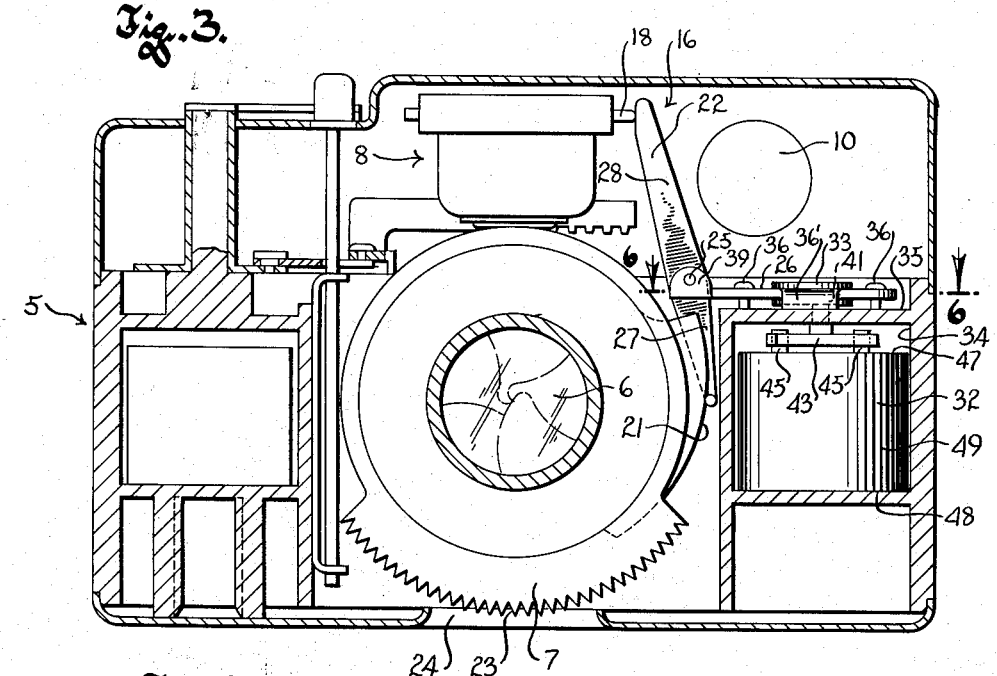
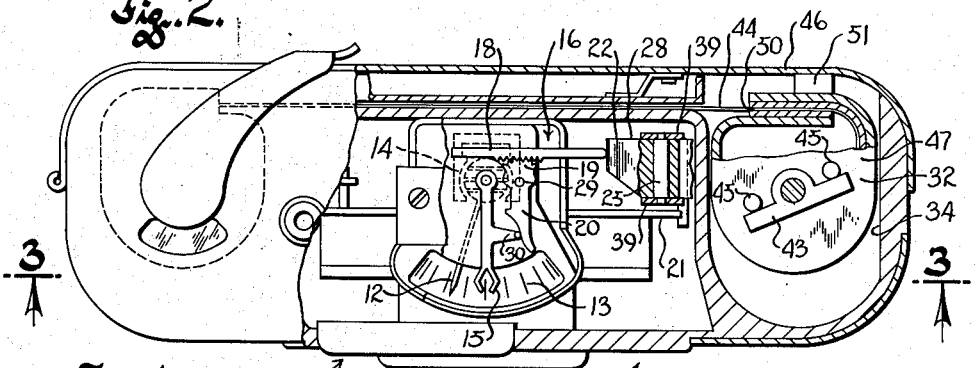
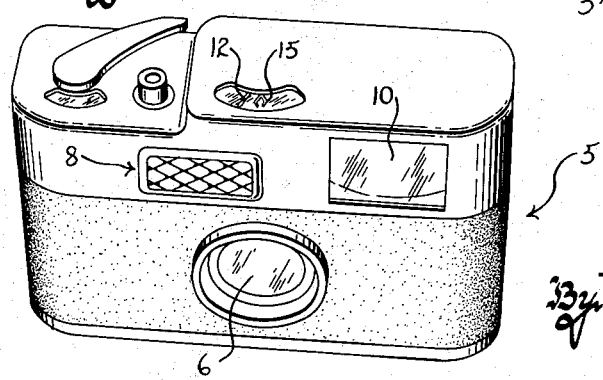
Inventor
Erik A. Wilkenson

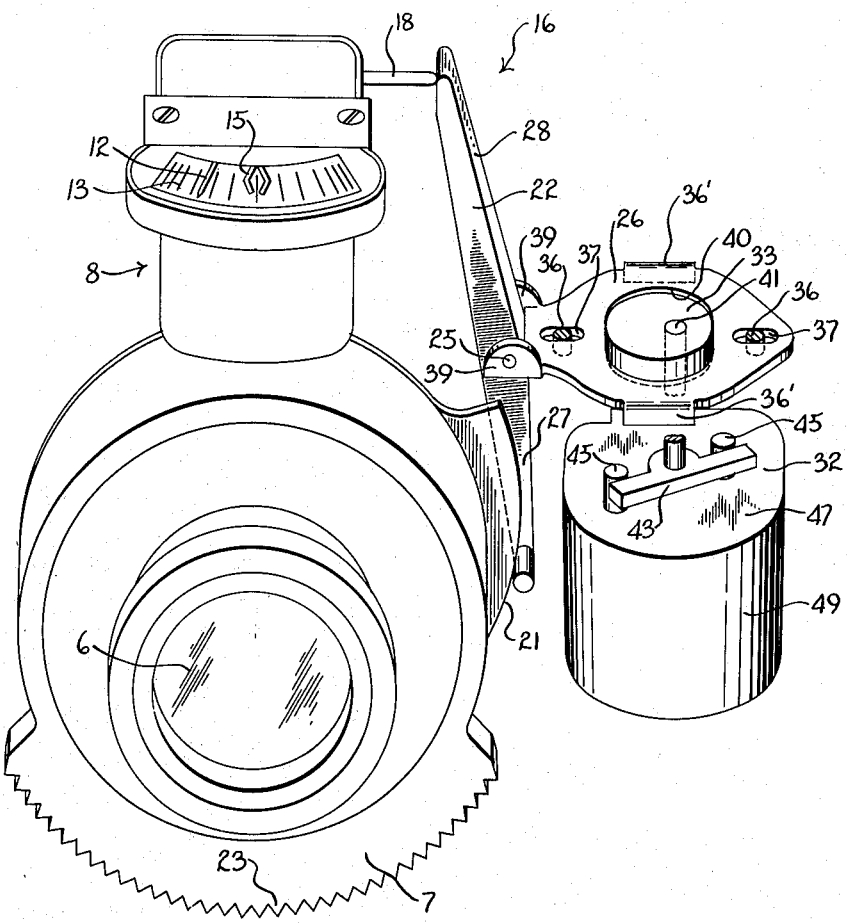
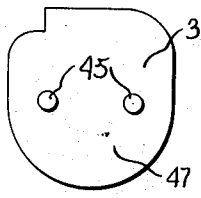
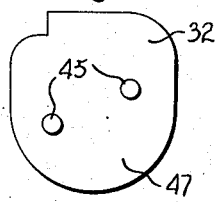
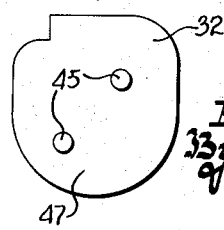

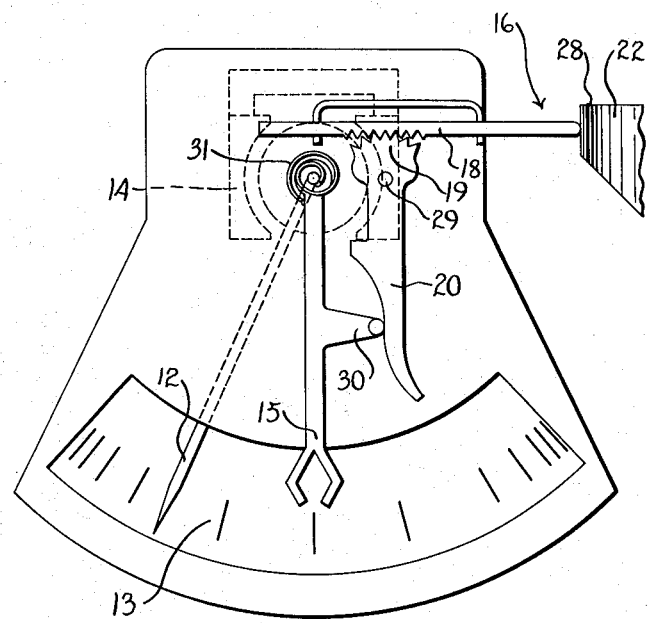
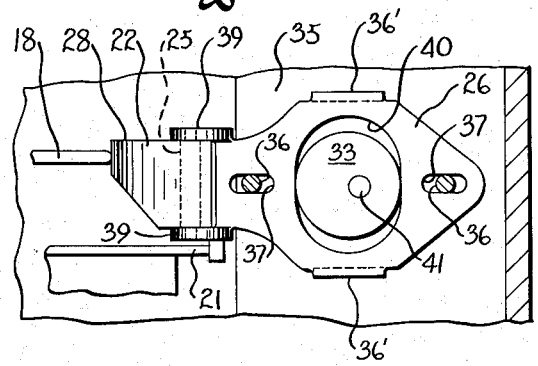

United States Patent Office 3,025,777
Patented Mar. 20, 1962

3,025,777
AUTOMATIC COMPENSATION FOR FILM EMULSION SPEED IN A CAMERA WITH LIGHT METER
Erik A. Wilkenson, Prins Georgsgaten 20, Halsingborg, Sweden
Filed Dec. 2, 1960, Ser. No. 73,299
8 Claims. (Cl. 95—10)

This invention relates to photographic cameras of the type having coupling means for effecting adjustment of exposure value in accordance with lighting conditions detected by a light meter built into the camera; and the invention refers more particularly to means for effecting compensation of such coupling means for the emulsion speed of film in the camera, so that the exposure value setting of the camera for a given light intensity will be proper for the film with which the camera is loaded.

Exposure value is a function of lens aperture and shutter speed, which can be varied relative to one another, within certain limits, in accordance with well established relationships. Hence a camera can be provided with linkage connecting its lens aperture and shutter speed control mechanisms so that simultaneous adjustment of both of them can be effected by means of a single actuator which provides one or more combinations of exposure time and lens aperture that will be correct for any given lighting condition within the normal range for which the camera is intended. Obviously, adjustment for different lighting conditions can also be made by means of an actuator that effects only shutter speed adjustment in a camera having a fixed lens aperture, or by an actuator that effects only aperture adjustment in a camera having a fixed shutter speed.

The provision of a single control for the adjustment of exposure value has made it possible to couple that control, either manually or automatically, with a light meter built into the camera. A common form of coupling between a light meter and a manually movable exposure value actuator comprises a follower pointer which is mounted to swing coaxially with the needle or pointer of the light meter and which is mechanically linked with the manual actuator so as to move in unison therewith. When the position of the follower pointer along the light meter scale coincides with the position of the light meter needle, the camera is properly adjusted to make a correct exposure for prevailing lighting conditions as detected by the light meter.

Regardless of whether the coupling between the exposure value setting actuator and the light meter is manual or automatic, it must always be adjusted or compensated in accordance with the emulsion speed of the film with which the camera is loaded, since a lens aperture and exposure time combination which will produce proper exposure of one type of film under given lighting conditions will result in overexposing a faster film and underexposing a slower film under the same lighting conditions.

Heretofore the most common provision for compensating the coupling between the light meter and the exposure value actuator for different film emulsion speeds has comprised manually adjustable means, such as a special emulsion speed adjustment ring, which was intended to be positioned according to the emulsion speed of film in the camera. The requirement for manual adjustment of the emulsion speed compensation means was obviously undesirable since it required the photographer to attend to this control whenever the camera was loaded with film of a different emulsion speed from that previously used in it, and possibly at other times as well. A manually operated instrumentality for setting emulsion speed values was also undersirable because it could be overlooked, misunderstood or misused, with resultant spoilage of film and possible irretrievable loss of photographic opportunities. At best its presence, and the need for adjustment of it, detracted from the simplicity and desired automatic operation of the camera.

Certain expedients have heretofore been proposed for accomplishing automatic adjustment of the coupling between the light meter and the exposure value setting actuator to compensate for different film emulsion speeds. Such automatic devices usually comprised a sensing element on the camera body which was connected with the coupling between the light meter and the exposure value actuator and which was positioned by an abutment or the like on the cartridge in which unexposed film was carried in the camera. The sensing element engaged the cartridge under bias, and insertion of a cartridge into the camera moved the sensing element against its bias to a position determined by the location on the cartridge of the emulsion speed abutment. In such devices the biasing force upon the sensing element was inevitably transferred to the cartridge, and thus tended to displace the cartridge out of the position in the camera body that it was intended to occupy. This was obviously objectionable, since the maintenance of the cartridge very precisely in its predetermined position is critical for proper operation of the film transport by which film is carried through the camera for each successive exposure.

With the foregoing in mind, it is an object of this invention to provide, in a camera of the character described, means for adjusting the coupling between a light responsive device and an actuator by which exposure value settings are controlled, to automatically compensate said coupling for the emulsion speed of film loaded into the camera, wherein such compensation of the coupling is controlled by abutment means on a cartridge containing the unexposed film, but wherein no biasing force is imposed upon the cartridge that might tend to displace it from its predetermined position in the camera body.

It is also an object of this invention to provide a film cartridge for a camera of the character described, which cartridge has abutment means adapted for cooperation with a sensing element in the camera whereby compensation for film emulsion speed is automatically effected in the coupling between a light meter built into the camera and an actuator by which exposure value settings are adjusted.

It is also an object of this invention to provide, in apparatus of the character described, a film cartridge having abutments disposed in a predetermined relationship corresponding to the emulsion speed of film in the cartridge, and a sensing element cooperable with the abutments to control the coupling between a light meter and an exposure value actuator, wherein no biasing force is imposed either upon the sensing element or the film cartridge so that there is no tendency for the film cartridge to be displaced from a predetermined position and location in the camera body with consequent possible malfunctioning of the film transport.

With the above and other obects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiments of the invention constructed according to the best mode so far devised for the practical application of the principles thereof, and in which:

FIGURE 1 is a perspective view of the camera of this invention;

FIGURE 2 is a top view of the camera, with parts broken away and shown in section;

FIGURE 3 is a cross sectional view through FIGURE 2 on the plane of the line 3—3;

FIGURE 4 is a perspective view of the shutter adjusting mechanism;

FIGURE 5 is a top view of the light meter indicator and the directly associated parts of a linkage by which shutter adjustment can be coordinated with the light meter reading;

FIGURE 6 is a detail sectional view through FIGURE 3 on the plane of the line 6—6; and FIGURES 7, 8 and 9 are top views of different film cartridges that may be used in the camera.

Referring now more particularly to the accompanying drawings, the numeral 5 designates generally the body of a photographic camera having an objective lens 6 and exposure control mechanism which includes an actuator 7. The actuator may comprise a rotatable ring concentric with the lens, connected in a known manner with means (not shown) for controlling either lens aperture or shutter speed, or both, so that the actuator constitutes, in any case, a single control by which exposure value adjustments can be set into the camera.

It will be understood that the camera is provided with shutter cocking, shutter release and film transport instrumentalities, as well as with exposure counting means if desired, but these are not illustrated since they form no part of the present invention.

Built into the body 5 of the camera is a photoelectric cell 8 which is exposed at the front of the camera to be affected by light illuminating a scene at which the camera is aimed. A view finder 10 facilitates selection of the scene upon which the objective lens 6 is to be focused.

While the present invention is readily adaptable to cameras having mechanical coupling between the photoelectric cell 8 and the exposure value control actuator 7, whereby the actuator is positioned automatically in accordance with the intensity of the light falling upon the photoelectric cell, the invention is herein shown and described as applied to a camera wherein the actuator 7 is intended to be manually adjusted, and wherein the position of the actuator is controlled by visual reference to a light meter of which the photoelectric cell comprises a part.

To this end the light meter comprises a needle or pointer 12 mounted to be swung back and forth across a scale 13 by a galvanometer mechanism 14 that is electrically connected with the photoelectric cell 8. The setting of the actuator 7 is indicated by a follower pointer 15 which is mounted coaxially with the light meter needle 12 and which has a motion transmitting connection, generally designated 16, with the actuator. As brought out hereinafter, the linkage 16 of the follower pointer 15 with the actuator 7 is such that when the actuator is adjusted to provide the proper aperture and/or shutter speed settings for the prevailing lighting conditions and the emulsion speed of the film with which the camera is loaded, the follower pointer 15 will overlie the meter needle 12.

In general, the linkage or motion transmitting connection 16 between the actuator 7 and the follower pointer 15 comprises an endwise slidable rack 18, a pinion segment 19 which cooperates with the rack and which has an integral arm 20 that actuates the follower pointer, a circumferential cam surface 21 on the actuator ring 7, and a medially fulcrumed lever 22 which provides a motion transmitting connection between the cam surface 21 and the rack 18.

As the description proceeds it will become apparent that the linkage 16 between the actuator 7 and the follower pointer 15 includes a series of unidirectional driving connections, and therefore the follower pointer is biased, by means of a helical torsion spring 31, to swing in the direction counter to that in which it is driven through the linkage 16.

The actuator ring 7 has a knurled circumferential portion 23 that is accessible through an opening 24 in the bottom of the camera body to facilitate rotation of the actuator about the axis of the objective lens 6. The cam surface 21 may be formed on a portion of the actuator ring which is circumferentially adjacent to the knurled portion 23 and which is spaced a substantial distance below the rack 18. The lever 22, the fulcrum 25 of which is carried on a slider 26 as described hereinafter, has one arm 27 which extends downwardly from its fulcrum and provides a cam follower that engages the cam surface 21 and has a upwardly extending arm 28 abuttingly engaged with an end of the rack 18. The pinion segment 19 is trunnioned on a fixed pin 29 and has its teeth disposed on an arc coaxial with its trunnion axis and meshingly engaged with the teeth on the rack 18, so that endwise motion of the rack effects swinging movement of the arm 20 which is integral with the pinion segment. A shoe 30 on the follower pointer provides a cam follower which bears against the side surface of the arm 20 to transmit swinging motion of said arm to the follower pointer.

It will now be apparent that rotation of the actuator ring 7 in one direction is translated into swinging movement of the lever 22 in a corresponding direction by the coaction of the cam surface 21 with the cam follower arm 27 of said lever, and as the lever swings it moves the rack 18 endwise to effect a corresponding swinging motion of the arm 20 by which the follower pointer is moved. It will also be apparent that the torsion spring 31, by its bias upon the follower pointer, maintains the shoe 30 at all times engaged with the arm 20, and similarly maintains the lever arm 28 at all times engaged with the adjacent end of the rack 18, as well as urging the cam follower arm 27 of the lever 22 into contsant engagement with the cam surface 21.

Although the position of the follower pointer 15 in its range of swinging motion will at all times be a function of the rotational position of the actuator ring 7, due to the linkage 16 that includes the medially pivoted lever 22, the exposure value setting to which the actuator ring 7 must be adjusted varies not only with light intensity but also with the emulsion speed of the film with which the camera is loaded. To meet this requirement, the present invention provides means for automatically adjusting the location of the fulcrum 25 of the lever 22 in accordance with the emulsion speed of film in the camera, so that for a given light intensity the needle 12 and follower pointer 15 will be in coincidence at higher or lower exposure value settings of the actuator 7, as needed to produce proper exposure of the film with which the camera is loaded. Hence, when the photographer moves the actuator 7 to where the follower pointer 15 is in superimposed relationship with the meter needle 12, the emulsion speed of the film in the camera will be set for a proper exposure under the prevailing light conditions detected by the exposure meter.

Such compensatory adjustment of the location of the fulcrum 25 is effected automatically by means on a cartridgt 32 in which unexposed film is loaded into the camera, acting upon mechanism in the camera to shift the fulcrum. This mechanism which cooperates with the cartridge comprises, in general, the slider or carriage 26 which carries the fulcrum 25 of the lever 22, and an eccentric 33 which affords a mechanical connection between the cartridge and the slider.

The cartridge 32 is housed in a suitable chamber or holder 34 in the camera body which disposes the cartridge in a predetermined position secure against rotation. The eccentric 33 is rotatably journaled in the top wall 35 of the cartridge chamber, which also provides a support upon which the slider 26 is mounted for back and forth movement relative to the camera body, along a defined path extending substantially parallel to the directions of endwise movement of the rack 18. The slider is confined to such motion by having flanges 36' thereon ride upon the wall 35 and by means of headed studs 36 or the like fixed in the wall 35 and projecting upwardly through elongated slots 37 in the slider. Near one end thereof the slider has upwardly projecting ears 39 at its opposite sides, in which are engaged the end portions of a pin which provides the fulcrum 25 for the lever 22.

The rotatable eccentric 33 occupies a transversely enlarged slot or opening 40 in the slider and has its shaft 41 rotatably journaled in the top wall 35 of the cartridge holder. Hence, rotation of the eccentric about the axis of its shaft 41 is translated into back and forth movement of the slider. However, when a film cartridge is properly loaded into the cartridge holder 34, the cartridge holds the eccentric against rotation and disposes it in an angular position corresponding to the emulsion speed of film in the cartridge, due to the engagement of a sensing element 43 on the shaft of the eccentric with abutments 45 on the cartridge. The sensing element simply comprises a lever or arm secured to the lower end of the shaft, and extending radially in opposite directions therefrom to provide abutments facing circumferentially in opposite directions and towards the back 46 of the camera which, of course, must be removed to allow insertion and removal of both film cartridges.

The cartridge 32 is in most respects conventional, having top and bottom end walls 47 and 48 and a semi-cylindrical side wall 49. Unexposed film 44 is coiled in the cartridge about an axis which substantially coincides with the rotational axis of the eccentric when the cartridge is properly installed in its holder 34, and such film is withdrawn from the cartridge, for transport through the camera, through a slit 50 in the flat side wall portion of the cartridge.

The abutments 45 may be formed as integral protuberances on the upper end wall 47 of the cartridge, and they are so located that as the cartridge is installed in the holder, they collide with the oppositely extending arms of the lever 45 and thus rotate the eccentric 33 in one direction or the other. When the cartridge is fully installed in its holder the abutments will be equispaced from and exactly diametrically opposite the axis of rotation of the eccentric, and will hold the eccentric in a position of rotation corresponding to the emulsion speed of the film in the cartridge. Because the arms of the lever or sensing element 43 which engage the abutments 45 face circumferentially in opposite directions, the position of the eccentric is fixed by the engagement of said lever with the abutments, despite the fact that no biasing force is imposed upon the lever or the cartridge.

It should also be observed that since the shaft 41 of the eccentric is journaled in top wall 35 of the cartridge chamber or holder 34, the engagement of the abutments 45 on the cartridge with the oppositely extending arms of the lever 43 accurately locates the cartridge with respect to the film transport; and that by virtue of the engagement of a retaining finger 51 on the back 46 of the camera with the adjacent wall of the cartridge, replacement of the camera back holds the abutments 45 firmly against the lever 43.

Comparison of FIGURES 7, 8 and 9, which are top views of cartridges containing film of different emulsion speeds, will at once show that the angular position of the abutments 45 with respect to the axis of the cartridge is different for each of the several film emulsion speeds. Thus insertion of each of the different cartridges shown in FIGURES 7, 8 and 9 into the camera will rotate the eccentric 33 to a predetermined position of rotation, and in so doing will shift the slider or carriage 26 along its path of motion to a position corresponding to the emulsion speed of the film contained therein. With this adjustment of the slider the location of the fulcrum 25 moves in directions parallel to the rack 18, and generally parallel to the directions in which the arm 27 of the lever 22 is swung by the cam 21, and this shifting of the fulcrum assures that the position of the follower pointer 15 along the light meter scale will be a function both of the position of adjustment of the exposure value actuator 7 and of the emulsion speed of the film with which the camera is loaded.

From the foregoing description taken together with the accompanying drawings it will be apparent that this invention provides, in a photographic camera having a coupling between its exposure value setting actuator and a light meter built into the camera, means for automatically compensating said coupling in accordance with the emulsion speed of film loaded into the camera; and it will also be apparent that the emulsion speed compensation mechanism comprises abutments on a film cartridge in which unexposed film is loaded into the camera, which abutments are adapted for cooperation with a sensing element in the camera that imposes no biasing force upon the film cartridge.

What is claimed as my invention is:

1. In a camera having an actuator which is manually movable along a defined path and which can be positioned to provide any one of a number of different exposure settings, means for correlating the position of said actuator with the indications of a light value pointer in a light responsive mechanism to provide an indication of whether or not the exposure setting for which the actuator is positioned is proper for the light falling upon the light responsive mechanism and for the emulsion speed of film in the camera, said means comprising: an indicator on the camera movable back and forth along a defined path that permits of ready comparison of the position of the indicator with that of the light value pointer of a light responsive mechanism; a slider mounted in the camera for movement in opposite directions along a defined path; a lever in the camera; cooperating means on one part of said lever and on the actuator providing a motion transmitting connection between them; cooperating means on another part of the lever and on said slider mounting the lever in the camera for bodily translatory motion and for swinging movement; means providing a motion transmitting connection between a third part of the lever and the indicator whereby the position of the indicator is at all times dependent upon the position of the actuator and the slider; an eccentric mounted in the camera for rotation about an axis which is fixed with respect to the camera; cooperating means on said eccentric and on the slider providing a motion transmitting connection between them whereby the angular position of the eccentric determines the position of the slider along its defined path; means fixed on the eccentric providing a pair of abutments which are radially spaced from the rotational axis of the eccentric and which face in opposite rotational directions; a film cartridge removably fixed in the camera; and means on the cartridge defining locating abutments cooperable with said abutments on the eccentric to hold the eccentric against rotation, said locating abutments being in such locations on the cartridge as to establish the angular position of the eccentric in accordance with the emulsion speed of film in the cartridge.

2. The camera of claim 1, further characterized by the fact that said locating abutments on the cartridge are provided by integral protuberances formed on an end wall of the cartridge.

3. In a photographic camera having a member movable along a defined path and which is adapted to be positioned at a location along said path that corresponds to the emulsion speed of film in the camera, means for positioning said member automatically in consequence of loading film into the camera, said means comprising: an eccentric mounted in the camera for rotation about an axis which in fixed with respect to the camera and having a motion transmitting connection with said member whereby the position of said member along its defined path is a function of the angular position of the eccentric about its rotational axis; means on the eccentric defining a pair of abutments which are radially spaced from the rotational axis of the eccentric and which face in opposite rotational directions; a film cartridge holder in the camera for releasably holding a film cartridge in a predetermined location and position; a film cartridge in said holder; and means on the film cartridge defining a pair of locating abutments which are engageable with said abutments on the eccentric when the cartridge is in said holder to establish the angular position of the eccentric, said locating abutments being at locations on the cartridge which correspond with the emulsion speed of film therein.

4. A photographic camera of the type having a member which is adapted to be positioned at any of a number of different locations, each of which corresponds to the emulsion speed of film in the camera, and the position of which member is established automatically by the loading of a film cartridge into a cartridge holder in the camera, said camera being characterized by: the fact that said member is rotatable on an axis which is fixed with respect to the camera; further characterized by abutment means on said member, radially spaced from its rotational axis and facing in opposite rotational directions; and further characterized by means on a film cartridge in the camera defining a pair of spaced apart locating abutments cooperating with said abutments on said member to establish the angular position of the latter in accordance with the emulsion speed of film in the cartridge.

5. In a photographic film cartridge of the type having side and end walls and which is adapted to be secured in a fixed position in a camera and to house a roll of film with the axis of the roll perpendicular to its end walls, to be withdrawn from the cartridge through a slit in a side wall portion: means on an end wall of the cartridge defining locating shoulders projecting from said end wall at locations spaced radially to opposite sides of the axis of the roll of film in the cartridge and which locations bear a predetermined fixed relationship to the emulsion speed of the film in the cartridge, said shoulders facing toward the side wall of the cartridge which first enters the camera during insertion of the cartridge into the camera so as to be engageable with a sensing element mounted in the camera in the path of the shoulders for rotation about an axis substantially coinciding with that of the roll of the film in the cartridge when the cartridge is fully inserted, to hold said sensing element in an angular position corresponding to the emulsion speed of the film in the cartridge.

6. In a camera: means defining a film-cartridge-receiving pocket having spaced top and bottom walls; a shaft passing through one of said walls and mounted for rotation about a fixed axis perpendicular to said wall; a sensing element fixed to the shaft inside the pocket and extending to opposite sides of the shaft axis; a film cartridge removably received in said pocket, said film cartridge having side and end walls, the end walls being adjacent to the top and bottom walls of the pocket when the cartridge is in place, the sensing element being between the wall of the pocket through which the shaft passes and the adjacent wall of the cartridge, said cartridge housing a roll of film with the axis of the roll perpendicular to its end walls so that the film can be withdrawn from the cartridge through a slit in a side wall portion thereof; means holding the cartridge in said pocket with its roll of film substantially coaxial with the shaft; and means on the end wall of the cartridge which is adjacent to the wall of the pocket through which the shaft passes defining locating shoulders which project from said end wall at locations spaced radially to opposite sides of the axis of the roll of film in the cartridge and which face toward the wall of the cartridge which first enters the camera during insertion of the cartridge, so as to be engageable with the sensing element at opposite sides of the axis of its shaft to rotate the sensing element and the shaft to a predetermined angular position depending upon the placement of said shoulders on the cartridge end wall, and said shoulders being placed on the cartridge end wall to correspond with the emulsion speed of the film in the cartridge so that upon complete insertion of the cartridge into the camera, said sensing element and the shaft are moved to and held in positions bearing a definite relationship to the emulsion speed of the film.

7. In a camera of the type having a manual actuator member which is movable in a defined path to provide for exposure adjustments, a photosensitive cell, and a pointer operatively connected with the cell and swingable about an axis fixed with respect to the camera to indicate on a scale the intensity of light falling on the cell: a follower pointer mounted coaxially with the pointer; a slider member mounted for movement in opposite directions along a defined path; a lever having a pair of arms; means pivotally fulcruming the lever on one of said members so that movement of said member along its defined path effects translatory motion of the lever; means providing a motion transmitting connection between the other of said members and one arm of the lever whereby motion of said other member along its defined path effects swinging motion of the lever about its fulcrum; means providing a motion transmitting connection between the other arm of the lever and the follower pointer whereby the position of the follower pointer is dependent upon the positions of the manual actuator member and of the slider member along their respective paths of motion; means in the camera defining a film-cartridge-receiving pocket having spaced top and bottom walls; a shaft passing through one of said walls of the pocket and journaled for rotation about a fixed axis normal to said wall; a motion transmitting connection between the shaft and the slider member through which rotation of the shaft is translated into sliding motion of the slider member so that the angular position of the shaft about its axis establishes the location of the slider member along its path of motion; means on the shaft inside the cartridge-receiving pocket defining a pair of abutment surfaces movably overlying the wall of the pocket through which the shaft passes and radially spaced to opposite sides of the shaft axis; a film cartridge removably received in said pocket, the cartridge housing a roll of film and having end walls normal to the axis of the roll of film, connected by side walls, one of which side walls has a slit in it through which the film can be withdrawn from the cartridge for exposure; means for releasably holding the cartridge in the pocket with the end walls of the cartridge contiguous to the top and bottom walls of the pocket and the roll of film substantially coaxial with said shaft; and means on the end wall of the cartridge which is contiguous to the wall of the pocket through which the shaft passes providing a pair of locating abutments to engage said shaft carried abutment surfaces and thereby hold the shaft in an angular position determined by the locations of said locating abutments on the cartridge end wall, so that by correlating the locations of said locating abutments to the emulsion speed of the film in the cartridge, the location of the slider element may be made to correspond to the emulsion speed of the film in the cartridge.

8. In a camera having actuator means for effecting adjustment of exposure settings and a movable member connected with said actuator means for movement therewith, means for modifying the position of said movable member in accordance with a function of the emulsion speed of film carried in the camera, said means comprising: a slider in the camera mounted for movement in opposite directions along a defined path; means providing a motion transmitting connection between said slider and the movable member whereby the position of the movable member is modified in accordance with the position of the slider along its defined path; an eccentric in the camera mounted for rotation on an axis which is fixed with respect to the camera and having a motion transmitting connection with the slider whereby the slider is positioned along its path of motion in accordance with the angular position of the eccentric about its rotational axis; means on the eccentric defining a pair of abutments spaced radially from the rotational axis of the eccentric and facing in opposite rotational directions; a film cartridge removably fixed in the camera in a predetermined position and location; and means on the cartridge defining a pair of locating abutments opposing said abutments on the eccentric and engaging the same to hold the eccentric against rotation, said locating abutments on the cartridge being in such positions thereon as to hold the eccentric in a predetermined angular position corresponding to the emulsion speed of film in the cartridge.

References Cited in the file of this patent
UNITED STATES PATENTS

| | | |
|---|---|---|
| 2,186,611 | Martin | Jan. 9, 1940 |
| 2,493,928 | Rath | Jan. 10, 1950 |
| 2,952,194 | Goshima | Sept. 13, 1960 |
| 2,960,921 | Greger | Nov. 22, 1960 |